United States Patent [19]

Osgood et al.

[11] Patent Number: 5,589,933
[45] Date of Patent: Dec. 31, 1996

[54] OPTICAL FIBER TEST INSTRUMENT WITH MECHANICALLY POSITIONED ATTENUATOR

[75] Inventors: Edwin B. Osgood, Beaverton; Casey S. Shaar, Portland, both of Oreg.

[73] Assignee: Photon Kinetics, Inc., Beaverton, Oreg.

[21] Appl. No.: 328,832

[22] Filed: Oct. 24, 1994

[51] Int. Cl.$^6$ .................... G01N 21/00; G02B 26/02
[52] U.S. Cl. .................... 356/73.1; 250/227.18; 359/196; 359/227; 359/230; 359/231
[58] Field of Search .................... 356/73.1; 250/227.15, 250/227.16, 227.18; 359/196, 227, 230–231

[56] References Cited

U.S. PATENT DOCUMENTS

| | | | |
|---|---|---|---|
| 4,660,973 | 4/1987 | Mannschke | 356/73.1 |
| 4,737,026 | 4/1988 | Dalgoulte et al. | 356/73.1 |
| 4,737,027 | 4/1988 | Maeda | 356/73.1 |
| 4,752,125 | 6/1988 | Schicketanz et al. | 356/73.1 |
| 4,789,237 | 12/1988 | Inoue | 356/73.1 |
| 4,893,006 | 1/1990 | Wakai et al. | 356/73.1 |
| 4,958,926 | 9/1990 | Bu-Abbud | 356/73.1 |
| 4,960,989 | 10/1990 | Liebenrood et al. | 356/73.1 |
| 5,000,540 | 3/1991 | Nakamura | 250/227.14 |
| 5,028,775 | 7/1991 | Furukawa et al. | 356/73.1 |
| 5,072,111 | 12/1991 | Gilino | 356/73.1 |
| 5,177,354 | 1/1993 | Tomita et al. | 356/73.1 |
| 5,323,224 | 6/1994 | Wada | 356/73.1 |

FOREIGN PATENT DOCUMENTS

| | | | |
|---|---|---|---|
| 0405553 | 1/1991 | European Pat. Off. | 356/73.1 |
| 2847488 | 5/1980 | Germany | 356/73.1 |
| 58-113832 | 7/1983 | Japan | 356/73.1 |
| 3-181836 | 8/1991 | Japan | 356/73.1 |

*Primary Examiner*—Frank Gonzalez
*Assistant Examiner*—Jason D. Eisenberg
*Attorney, Agent, or Firm*—Smith-Hill and Bedell

[57] ABSTRACT

An optical test instrument, for testing response of an optical medium to optical energy, comprises a light source for emitting optical energy in response to electrical energy, a detector for providing an electrical output signal in response to incident optical energy, and a propagation path for delivering optical energy from the light source to the medium under test and for delivering optical energy from the medium under test to the detector. A positioning mechanism displaces an optical attenuator element between a first position, in which it is out of the propagation path, and a second position, in which it is interposed in a segment of the path in which the optical energy is propagated as a beam.

20 Claims, 3 Drawing Sheets

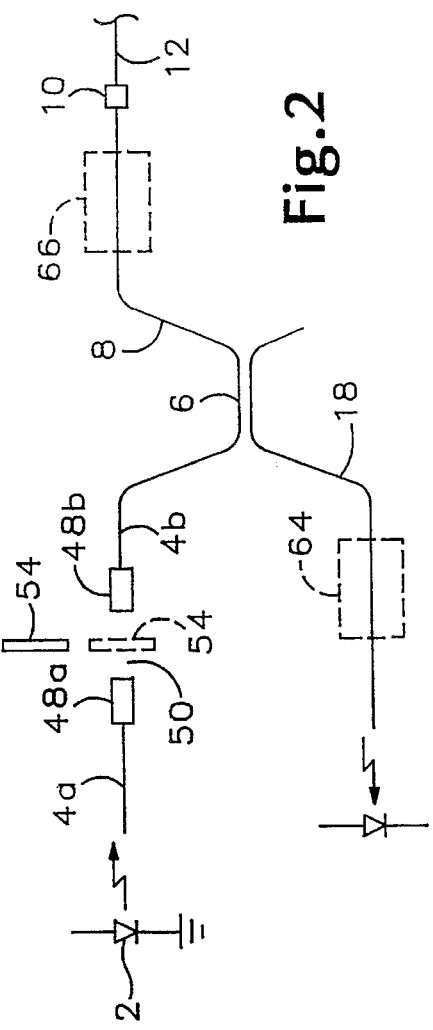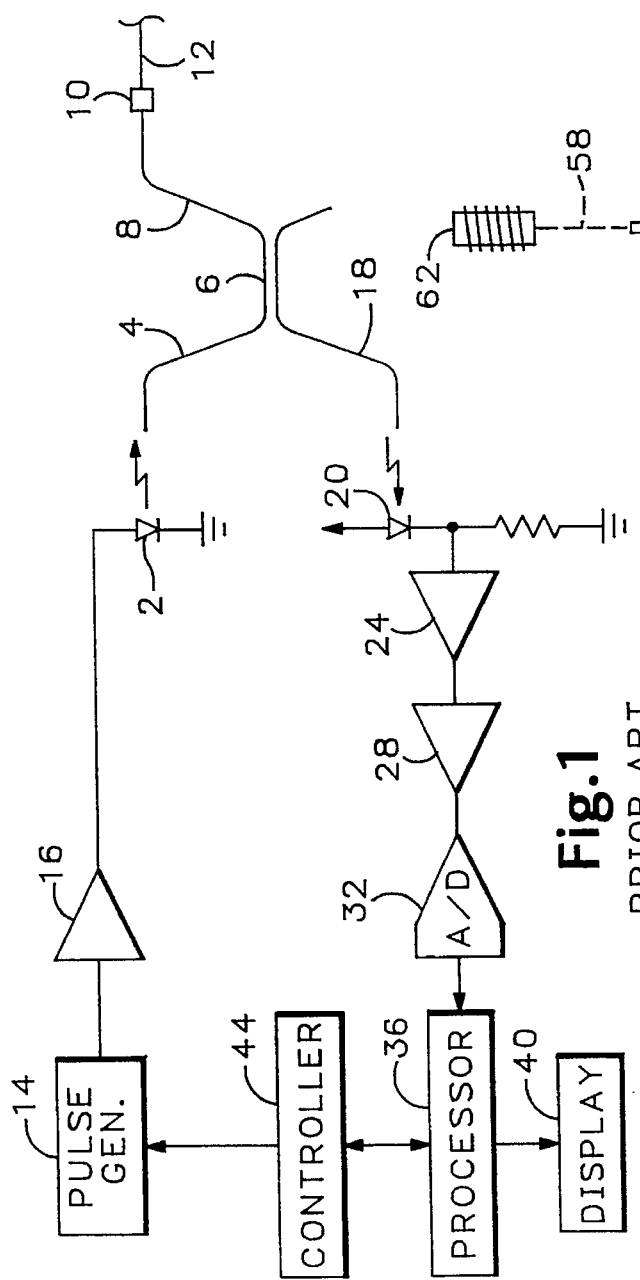

OPTICAL FIBER TEST INSTRUMENT WITH MECHANICALLY POSITIONED ATTENUATOR

BACKGROUND OF THE INVENTION

This invention relates to an optical fiber test instrument with a mechanically positioned optical attenuator.

It is conventional to use an optical fiber to communicate an information signal from an optical driver at a proximal end of the fiber to an optical receiver at a distal end of the fiber. The optical driver includes a laser diode that generates pulses of optical power at a frequency that depends on the information signal and launches the pulses into the fiber at the proximal end thereof. Some of the optical energy that is launched into the fiber is returned to the proximal end of the fiber due to Rayleigh back-scattering. It is of interest to the manufacturer of an optical fiber to determine the variation with distance along the fiber of the intensity with which optical energy undergoes Rayleigh back-scattering. This may be achieved using an optical time domain reflectometer (OTDR).

The conventional OTDR shown in FIG. 1 comprises a laser diode 2 which emits light at, for example, 1310 nm and is optically coupled through a single mode fiber 4, a directional coupler 6, a second single mode fiber 8, and a front panel connector 10 to the proximal end of a fiber under test, or target fiber, 12, which also is a single mode fiber. Current pulses are applied to the laser diode by a pulse generator 14 through a laser driver amplifier 16 and cause the laser diode 2 to emit brief pulses of light that are launched into the target fiber 12.

Optical energy that is reflected and back-scattered within the fiber 12 is coupled through the front panel connector 10, the fiber 8, the directional coupler 6, and a multi-mode fiber 18 to a photodiode detector 20. The detector 20 generates a current signal depending on the power with which return optical energy is emitted from the fiber 18 at its proximal end. A first amplifier 24 converts the current signal provided by the detector 20 to a voltage signal, and a second amplifier 28 amplifies the voltage signal and applies it to an analog-to-digital (A/D) converter 32. The digital signal provided by the A/D converter is processed by a processor 36, which is used to provide a display on a display device 40, e.g. a cathode ray tube, of the level of return power as a function of distance. Operation of the reflectometer is controlled by a controller 44.

The dynamic range of the optical signal received at the detector of an OTDR is enormous. In general, the intensity of the optical signal depends upon the distance along the fiber at which the back-scattering took place: the intensity of the back-scattered energy decreases with distance from the proximal end of the fiber under test. Therefore, when using the OTDR to examine a range that is close to the proximal end, the intensity of the back-scattered energy is higher than when examining a range that is far from the proximal end.

In order for the digital values provided by the A/D converter 32 to represent accurately the level of return power received at the detector 20, it is necessary that the detector not be overloaded by the return power, that amplifiers 24 and 28 not be saturated, and that the voltage signal applied to the A/D converter be within the converter's range.

U.S. Pat. No. 4,960,989 (Liebenrood et al) discloses an OTDR in which the gain of the detector is adjusted as a function of time relative to pulsing of the laser diode in order to prevent overdriving of the first amplifier. U.S. Pat. No. 4,960,989 is not concerned with the variation in power level due to change in intensity of Rayleigh back-scattering but with masking the effect of reflections, for example at connections between lengths of fiber and at breaks in the fiber.

It has also been proposed that the intensity of back-scattered light received at the detector should be controlled by controlling the current that is used to drive the laser diode. However, as the current is varied, the spectral characteristics of the light emitted by the laser diode also vary, and therefore the measurement results are not accurate.

SUMMARY OF THE INVENTION

In accordance with a first aspect of the present invention there is provided an optical test instrument, for testing response of an optical medium to optical energy, comprising a light source means for emitting optical energy in response to electrical energy, a detector for providing an electrical output signal in response to incident optical energy, a propagation means defining a path for delivering optical energy from the light source means to the medium under test and for delivering optical energy from the medium under test to the detector, at least one segment of the path defined by the propagation means being a segment in which the optical energy is propagated as a beam, an optical attenuator element, and a positioning means for displacing the optical attenuator element between a first position, in which it is out of said path, and a second position, in which it is interposed in said one segment of the path.

In accordance with a second aspect of the present invention there is provided an optical device for selectively switching optical energy received at a first optical input port or a second optical input port to an optical output port, comprising an optical coupling element, a first positioning means for displacing the optical coupling element between a first position, in which the first optical input port is coupled to the optical output port, and a second position, in which the second optical input port is coupled to the optical output port, whereby the first or second optical input port is selected, an optical attenuator element, and a second positioning means for displacing the optical attenuator element between a first position, in which it is out of the path from the selected optical input port to the optical output port, and a second position, in which it is interposed in said path.

In accordance with a third aspect of the present invention there is provided an optical device for selectively switching optical energy received at a first, second, or third optical input port to an optical output port, comprising a first optical coupling element, a second optical coupling element, a first positioning means for displacing the first optical coupling element between a first position, in which it receives light from the first optical input port and directs it toward the optical output port, and a second position, and a second positioning means for displacing the second optical coupling element between a first position, in which it receives light from the second optical input port and directs it toward the optical output port, and a second position, the second positions of the first and second optical coupling elements being such that when they are both in their second positions, the third optical input port is coupled to the optical output port and when either optical coupling element is in its first position, the third optical input port is optically isolated from the optical output port, whereby the first, second, or third optical input port is selected, and the device further comprising an optical attenuator element, and a third positioning means for displacing the optical attenuator element between a first position, in which it is out of the path from the selected optical input port to the optical output port, and a second position, in which it is interposed in said path.

BRIEF DESCRIPTION OF THE DRAWINGS

For a better understanding of the invention, and to show how the same may be carried into effect, reference will now be made, by way of example, to the accompanying drawings in which:

FIG. 1 illustrates schematically a conventional OTDR,

FIG. 2 is a partial schematic illustration of a first OTDR embodying the present invention.

DETAILED DESCRIPTION

Figure 3:
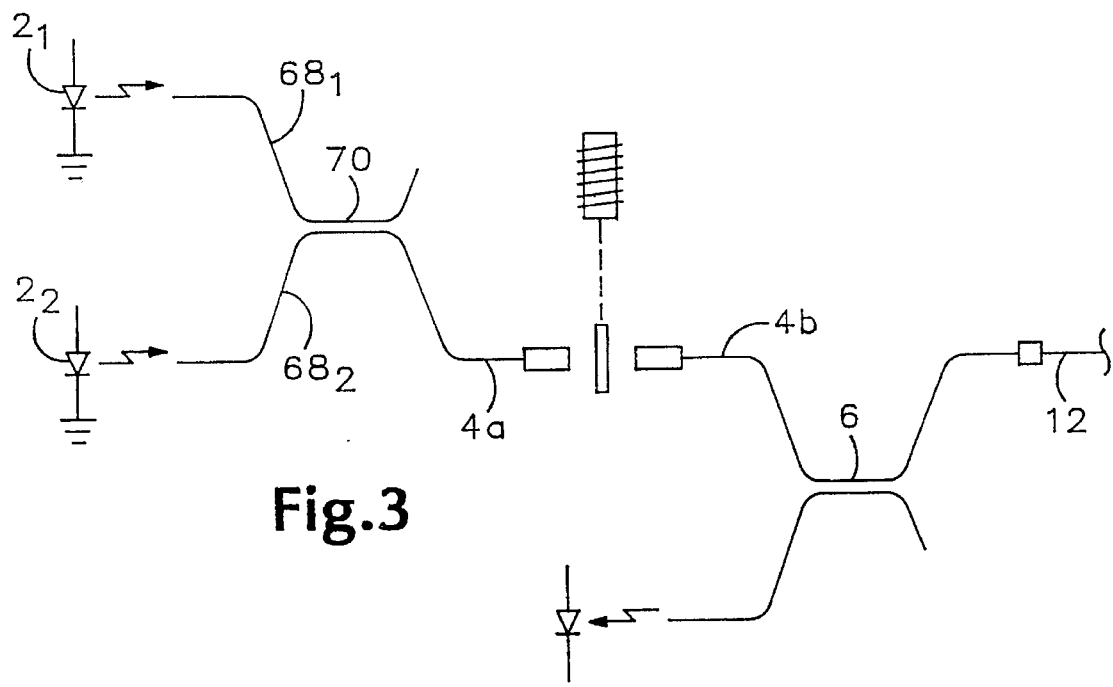
FIG. 3 is a partial schematic illustration of a second OTDR embodying the present invention.

The reflectometer shown in FIG. 2 is similar to that shown in FIG. 1 except that the fiber 4 is divided into two segments 4a and 4b, which are connected to respective graded index (GRIN) lenses 48a and 48b. The lenses are in coaxially aligned confronting relationship across a free space 50. Accordingly, a light pulse from the laser diode 2, traveling to the directional coupler 6, is propagated through the fiber segment 4a in confined manner and is converted to a collimated light beam by the GRIN lens 48a. The light beam traverses the space 50 and is focused into the fiber segment 4b by the GRIN lens 48b, and the light then continues in confined manner.

A neutral density filter 54 is mounted adjacent the space 50 on an arm 58 that is movable under control of a solenoid 62 to displace the arm between a first position in which the filter 54 is outside the space 50 and a second position, shown in dashed lines, in which the filter 54 is inside the space 50. Thus, in the second position of the arm 58, the filter 54 is traversed by the light beam passing from the GRIN lens 48a to the GRIN lens 48b. In this manner, an optical attenuator is selectively interposed in the fiber 4 under control of the solenoid 62.

The solenoid 62 is energized by current supplied by an amplifier (not shown) operating under control of the controller 44. During a far probing interval, in which the controller controls operation of the A/D converter so that the digital values are representative of the level of power with which light is back-scattered from a range that is far from the front panel connector 10, the solenoid places the arm 58 in its first position so that the optical pulse launched into the fiber under test is not attenuated by the filter. On the other hand, during a near probing interval, in which the controller controls the A/D converter so that the OTDR examines a range that is close to the connector 10, the solenoid is controlled to position the arm in its second position, so that the light pulses that are launched into the fiber 12 are attenuated by the neutral density filter and the intensity of return light received at the detector is reduced correspondingly. The optical power incident on the detector is lower than if the arm were in its first position and so the detector is protected from overloading and the signal applied to the A/D converter is within the range of the A/D converter.

It will be appreciated that when testing a single target fiber 12 in the manner described above, two sets of digital values will be obtained, depending on the position of the neutral density filter, for the two different ranges from the connector 10, and if these two sets of values are used, without change, to provide a display of return power versus distance, the display will comprise two traces that are offset from each other along the power axis. Generally, such a result would be undesirable, and accordingly the values acquired when the arm is in the second position are scaled so that the two traces are aligned and merged to form a single trace.

It is not essential to the OTDR shown in FIG. 2 that the GRIN lenses and the space 50 be inserted in the fiber 4. The same result would be obtained if the attenuator were placed in the fiber 18 at the location 64. Alternatively, the attenuator may be placed at the location 66 in the fiber 8. In the case of the attenuator's being placed in the fiber 8, the desired attenuation of the attenuator would be half that in the case of the attenuator's being placed in the fiber 4 or the fiber 18, because the attenuator is traversed twice by light passing from the laser diode to the detector.

By using a mechanically positioned optical attenuator to reduce the intensity of light incident on the detector when examining the fiber 12 over a range that is close to the connector 10, it is unnecessary to alter the current supplied to the laser diode, and accordingly the current can be kept constant and the spectral characteristics of the light emitted by the laser diode are not affected by change in current.

In certain applications of an OTDR, it is desirable to be able to test the target fiber at multiple wavelengths. FIG. 3 illustrates an OTDR that is able to test the target fiber 12 at two wavelengths. The OTDR shown in FIG. 3 comprises two laser diodes $2_1$ and $2_2$, emitting light at 1310 nm and 1410 nm respectively, for example. The two diodes are coupled through respective fibers $68_1$ and $68_2$ to a 1410/1310 wavelength division multiplexer 70 having an output port connected to the fiber 4. The wavelength division multiplexer 70 is a directional coupler that defines two optical paths. Light at 1410 nm that enters the coupler along one path is confined within that path and exits the coupler on the same path, whereas light at 1310 nm that enters the coupler along one path crosses over and exits the coupler on the other path. Thus, the wavelength division multiplexer couples both the diode $2_1$ and the diode $2_2$ to the fiber 4. The attenuator is connected between the fiber segments 4a and 4b, as shown in FIG. 2. The OTDR shown in FIG. 3 therefore enables the target fiber to be tested at the wavelength of light emitted by either or both laser diodes.

Figure 4:
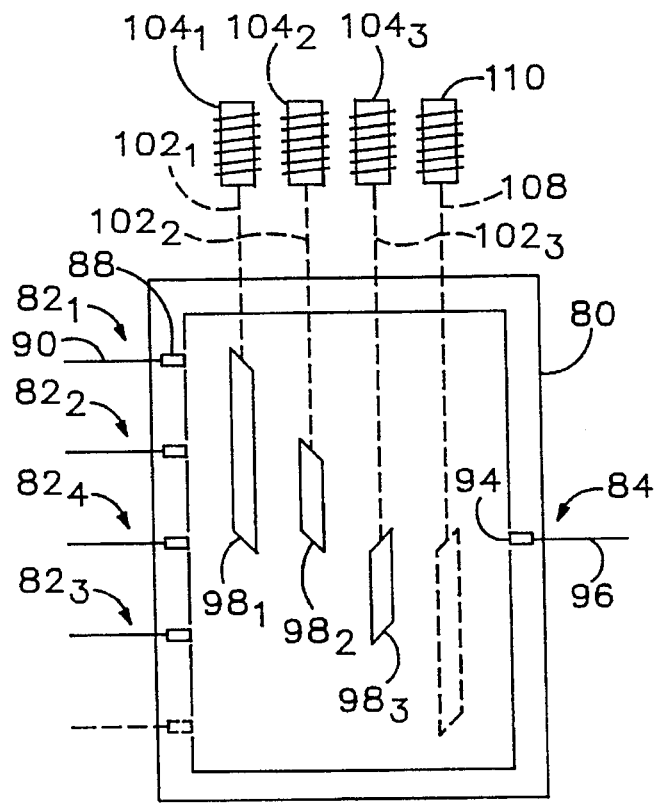
FIG. 4 is a schematic plan view of a conventional 4 by 1 optical switch.

FIG. 4 illustrates a 4 by 1 optical switch that comprises a rectangular housing 80 having four input ports $82_1$–$82_4$ along one edge and one output port 84 at the opposite edge. Each input port comprises a GRIN lens 88 having an optical fiber 90 pigtailed thereto. Similarly, the output port comprises a GRIN lens 94 having an optical fiber 96 pigtailed thereto. The axes of the input ports $82_1$–$82_3$ are in spaced parallel relationship with the axis of the output port 84, whereas the axis of the input port $82_4$ is aligned with the axis of the output port 84. Three prisms $98_1$–$98_3$ are mounted on respective arms $102_1$–$102_3$ and are displaceable under control of respective solenoids $104_1$–$104_3$ to positions in which they couple the ports $82_1$, $82_2$, and $82_3$ respectively to the output port 84, and isolate the input port $82_4$ from the output port. Thus, by energizing the solenoid $104_1$, for example, the input port $82_1$ is coupled to the output port 84 and the input port $82_4$ is isolated from the output port, whereas if no solenoid is energized, the input port $82_4$ is coupled to the output port.

An optical switch of the kind described above is sold by JDS FITEL, Inc. of Ontario, Canada under the designation SW14AZ-00 NC-068. This switch also has a fourth mounting arm 108 and a fourth solenoid 110 that are redundant to the function of the switch as a 4 by 1 switch but allow it to control a fourth prism, shown in dashed lines in FIG. 4, and implement a 5 by 1 switch. In this application, only one solenoid would ever be energized at any one time.

Figure 5:
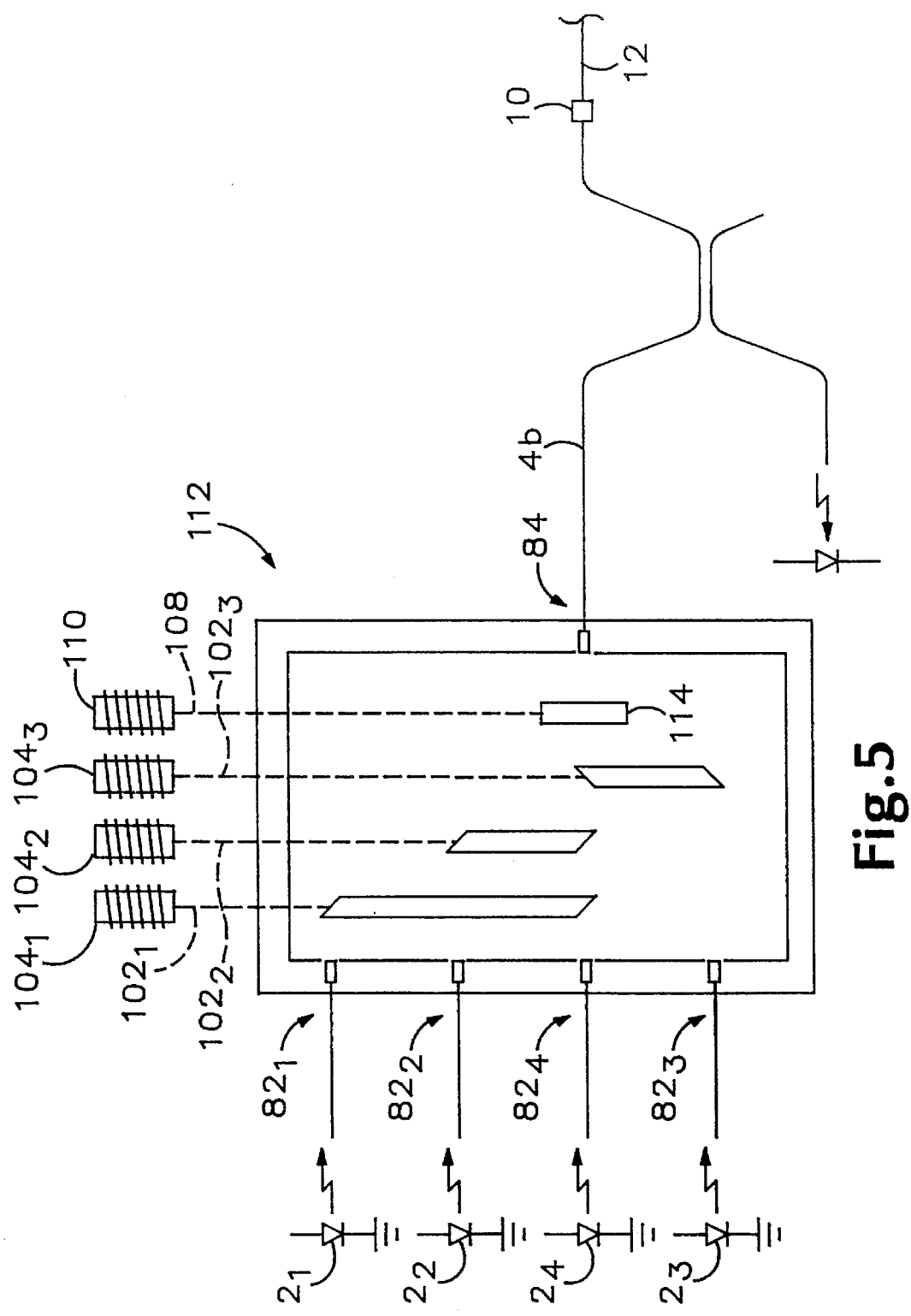
FIG. 5 is a partial schematic illustration of a third OTDR embodying the present invention.

The OTDR shown in FIG. 5 comprises four laser diodes $2_1$-$2_4$ operating at 1310 nm, 1360 nm, 1410 nm, and 1550 nm respectively. The four laser diodes are connected by respective fibers to the four input ports $82_1$ _$82_4$ respectively of a 4 by 1 optical switch 112 of the general type described above with reference to FIG. 4. The output port 84 of the switch 112 is connected to the fiber segment 4b. By controlling the solenoids $104_1$–$104_3$, optical pulses from any one of the laser diodes $2_1$–$2_4$ can be coupled into the fiber segment 4b and used for testing the fiber 12.

The switch 112 shown in FIG. 5 differs from the switch shown in FIG. 4 by virtue of the fact that a neutral density filter 114 is mounted on the mounting arm 108 and the solenoid 110 can be energized without regard to the states of the solenoids $104_1$–$104_3$. By energizing the solenoid 110, the filter 114 can be positioned immediately upstream of the output port 84 of the switch. Therefore, if the laser diode $2_1$, for example, is selected by energizing the solenoid $104_1$, by controlling the state of the solenoid 110 it is possible to select whether the optical pulses from the selected laser diode are attenuated by the filter 114 or are coupled into the fiber segment 4b without being attenuated.

It will be appreciated that the invention is not restricted to the particular embodiments that have been described, and that variations may be made therein within departing from the scope of the invention as defined in the appended claims and equivalents thereof. For example, the invention is not restricted to the particular wavelengths mentioned in connection with the description of the various embodiments of the invention. Also, although the embodiments shown in FIGS. 3 and 5 employ two laser diodes and four laser diodes respectively, the invention as implemented in FIG. 3 is not limited to use of only two laser diodes and similarly the invention as implemented in FIG. 5 is not limited to use of four laser diodes.

We claim:

1. An optical time domain reflectometer (OTDR), for launching pulses of light into an optical fiber under test at a proximal end thereof and measuring intensity of backscattered light returned to the proximal end of the optical fiber under test, the OTDR comprising:

a light source means for emitting optical energy in response to electrical energy, a detector for providing an electrical output signal in response to incident optical energy, a propagation means defining a path for delivering optical energy from the light source means to the optical fiber under test, whereby optical energy is launched into the fiber under test, and for delivering optical energy from the optical fiber under test to the detector, at least one segment of the path defined by the propagation means being a segment in which the optical energy is propagated in free space as an unconfined beam, and said propagation means comprising at least a first optical fiber segment and a second optical fiber segment, the first and second optical fiber segments being separated across said one segment of the path, an optical attenuator element, and a positioning means for displacing the optical attenuator element between a first position, in which it is out of said path, and a second position, in which it is interposed in said one segment of the path.

2. An OTDR according to claim 1, wherein the propagation means includes a coupler having an input port connected to receive optical energy from the light source means, an output port connected to deliver optical energy to the detector, and a third port for delivering optical energy to and receiving optical energy from the fiber under test said light source means comprises a laser diode and the first optical fiber segment extends from the laser diode and terminates at said one segment of the path, and the second optical fiber segment extends said one segment of the path and terminates at the input port of the directional coupler.

3. An OTDR according to claim 2, wherein the propagation means further comprises a third fiber segment connected to the third port of the coupler, for delivering optical energy to and receiving optical energy from the optical fiber under test, and a fourth fiber segment is connected between the output port of the coupler and the detector.

4. An OTDR according to claim 1, wherein said light source means comprises at least first and second light sources for emitting light at different respective wavelengths, and the OTDR further comprises an optical switch having at least first and second input ports coupled to the first and second light sources respectively and also having an output port, and a member that is selectively displaceable between a first position in which the first input port is coupled to the output port and the second input port is isolated from the output port, and a second position in which the second input port is coupled to the output port and the first input port is isolated from the output port.

5. An OTDR according to claim 4, wherein the second position of the optical attenuator element is between the selectively displaceable member and the output port of the optical switch.

6. An OTDR according to claim 1, wherein said light source means comprises at least first and second light sources for emitting light at different respective wavelengths, and the propagation means comprises an optical switch having at least first and second input ports coupled to the first and second light sources respectively and also having an output port, at least one optical coupling element, and a second positioning means for displacing the optical coupling element between a first position, in which the first input port of the switch is coupled to the output port thereof, and a second position, in which the second input port of the switch is coupled to the output port thereof.

7. An OTDR according to claim 6, wherein each of said positioning means comprises an electromechanical actuator.

8. An OTDR according to claim 6, wherein the second position of the optical attenuator element is between the optical coupling element and the output port of the optical switch.

9. An OTDR according to claim 1, wherein the propagation means comprises a directional coupler having an input port connected to receive optical energy from the light source means, an output port connected to deliver optical energy to the detector, and a third port for delivering optical energy to and receiving optical energy from the fiber under test, and wherein the first optical fiber segment extends from the third port of the directional coupler and terminates at said one segment of the path, and the second optical fiber segment extends beyond said one segment of the path for connection to the optical fiber under test.

10. An OTDR according to claim 1, wherein the optical attenuator element comprises a neutral density filter.

11. An OTDR according to claim 1, further comprising:
a sampler means for sampling said electrical output signal, and
a controller means, said controller means being connected to the light source means, the sampler means and the positioning means and controlling supply of electrical energy to the light source means to cause the light source means to emit pulses of optical energy that are launched into the optical fiber under test, controlling sample times at which the sampler means samples the electrical output signal such that during a near probing interval the sampler means samples the electrical output signal at sample times that are delayed relative to time of launch by a time that is in a first range and during a far probing interval the sampler means samples the electrical output signal at sample times that are delayed relative to time of launch by a time that is in a second range, which is longer than the first range, and controlling times at which the positioning means displaces the optical attenuator element such that in the far probing interval the attenuator element is in the first position and during the near probing interval the attenuator element is in the second position.

12. An optical test instrument for testing response of an optical medium under test to optical energy, comprising:
a light source means for emitting optical energy in response to electrical energy,
a detector for providing an electrical output signal in response to incident optical energy,
a propagation means defining a path for delivering optical energy from the light source means to the optical medium under test and for delivering optical energy from the optical medium under test to the detector, at least one segment of the path defined by the propagation means being a segment in which the optical energy is propagated as a beam, wherein the propagation means comprises a directional coupler having an input port connected to receive optical energy from the light source means, an output port, and a third port for delivering optical energy to and receiving optical energy from the fiber under test, a first optical fiber segment that extends from the output port of the coupler and terminates at said one segment of the path, and a second optical fiber segment that extends beyond said one segment of the path delivering optical energy to the detector,
an optical attenuator element, and
a positioning means for displacing the optical attenuator element between a first position, in which it is out of said path, and a second position, in which it is interposed in said one segment of the path.

13. An optical device for selectively switching optical energy received at a first optical input port or a second optical input port to an optical output port, comprising:
an optical coupling element,
a first positioning means for displacing the optical coupling element between a first position, in which the first optical input port is coupled to the optical output port, whereby the first optical input port is selected, and a second position, in which the second optical input port is coupled to the optical output port, whereby the second optical input port is selected,
an optical attenuator element, and
a second positioning means for displacing the optical attenuator element between a first position, in which it is out of the path from the selected optical input port to the optical output port, and a second position, in which it is interposed in said path.

14. An optical device according to claim 13, wherein the optical coupling element comprises a prism and the first positioning means comprises a mounting member on which the prism is mounted and a drive means for selectively moving the mounting member.

15. An optical device according to claim 14, wherein the optical attenuator element comprises a neutral density filter and the second positioning means comprises a mounting member on which the neutral density filter is mounted and a drive means for selectively moving the mounting member.

16. An optical device according to claim 15, wherein each of the drive means comprises an electromechanical solenoid.

17. An optical device for selectively switching optical energy received at a first, second, or third optical input port to an optical output port, comprising:
a first optical coupling element,
a second optical coupling element,
a first positioning means for displacing the first optical coupling element between a first position, in which it receives light from the first optical input port and directs it toward the optical output port and optically isolates the optical output port from the third optical input port, and a second position in which it allows light to pass from the third optical input port to the optical output port,
a second positioning means for displacing the second optical coupling element between a first position, in which it receives light from the second optical input port and directs it toward the optical output port and optically isolates the optical output port from the third optical input port, and a second position in which it allows light to pass from the third optical input port to the optical output port,
whereby the first optical input port is selected when the first optical coupling element is in its first position and the second optical coupling element is in its second position, the second optical input port is selected when the second optical coupling element is in its first position and the first optical coupling element is in its second position, and the third optical input port is selected when the first and second optical coupling elements are both in their second positions,
an optical attenuator element, and
a third positioning means for displacing the optical attenuator element between a first position, in which it is out of the path from the selected optical input port to the optical output port, and a second position, in which it is interposed in said path.

18. An optical device according to claim 14, wherein the optical attenuator element is a neutral density filter.

19. A method of measuring variation with distance along an optical fiber from a proximal end thereof of intensity with which optical energy launched into the fiber at said proximal end is returned to said proximal end due to backscattering, said method comprising:
employing a light source to emit light pulses,
employing a light detector to generate an electrical signal representative of intensity with which light is received by the detector,
employing a propagation means to propagate light along a first path from the light source to the proximal end of the optical fiber and to propagate return light along a second path from the proximal end of the optical fiber to the detector, whereby the light pulses emitted by the light source are launched into the fiber under test by way of the proximal end thereof and return light from the proximal end of the fiber under test is received by the detector, at least one of said optical paths including a segment in which light is propagated as an unconfined beam, sampling the electrical signal generated by the detector at sample times that are delayed relative to time at which a pulse is emitted by the light source, such that sample value depends on intensity with which light is returned from a segment of the fiber that is at a distance from the proximal end that depends on delay between time of launch and sample time, and displacing an optical attenuator element between a first position, in which the optical attenuator element is interposed in said segment of the optical path, and a second position, in which the optical attenuator element is outside said path, such that during a near probing interval, for which the sample time is delayed relative to time of launch by a time that is in a first range, the optical attenuator element is in said first position, and during a far probing interval, for which the sample time is delayed relative to time of launch by a time that is in a second range, which is longer than the first range, the optical attenuator element is in said second position.

20. A method according to claim 19, wherein the optical attenuator element is a neutral density filter and the method comprises physically displacing the neutral density filter between said first position and said second position between the near probing interval and the far probing interval.

* * * * *